United States Patent
Inagaki et al.

(10) Patent No.: US 7,651,175 B2
(45) Date of Patent: Jan. 26, 2010

(54) PARKING BRAKE SYSTEM

(75) Inventors: Hiromi Inagaki, Saitama (JP); Masaaki Myoi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 370 days.

(21) Appl. No.: 10/592,618

(22) PCT Filed: Mar. 28, 2005

(86) PCT No.: PCT/JP2005/005730

§ 371 (c)(1), (2), (4) Date: Mar. 23, 2007

(87) PCT Pub. No.: WO2005/093279

PCT Pub. Date: Oct. 6, 2005

(65) Prior Publication Data

US 2007/0289823 A1    Dec. 20, 2007

(30) Foreign Application Priority Data

Mar. 26, 2004  (JP) .............................. 2004-093583

(51) Int. Cl.
*B60R 25/08* (2006.01)

(52) U.S. Cl. .................... 303/89; 303/71; 188/71.9; 188/170

(58) Field of Classification Search .................. 303/89, 303/71, 115.1; 188/72.4, 265, 106 F, 106 P, 188/72.3, 71.9, 170

See application file for complete search history.

(56) References Cited

U.S. PATENT DOCUMENTS

| 3,321,050 | A | * | 5/1967 | Press | .......................... 188/71.9 |
| 3,944,027 | A | * | 3/1976 | Yamamoto | .................. 188/71.9 |
| 4,014,414 | A | * | 3/1977 | Yamamoto et al. | .......... 188/170 |
| 4,116,307 | A | | 9/1978 | Reinecke | |
| 4,691,809 | A | * | 9/1987 | Le Marchand et al. | ..... 188/71.9 |

(Continued)

FOREIGN PATENT DOCUMENTS

AU    A-84 646/82    5/1982

(Continued)

*Primary Examiner*—Robert A Siconolfi
*Assistant Examiner*—Mariano Sy
(74) *Attorney, Agent, or Firm*—Carrier, Blackman & Associates P.C.; Joseph P. Carrier; William D. Blackman

(57) ABSTRACT

A parking brake system is provided in which a parking brake state for a wheel brake (2A) is obtained by forward movement of a parking piston (44) slidably fitted into a casing (23) with the rear side of the parking piston (44) facing a parking control fluid pressure chamber (47), and the forwardly moved state of the parking piston (44) is mechanically locked by spheres (58) pushed up as a result of forward movement of a lock piston (56) of a lock mechanism (31). Moreover, a plurality of guide grooves (126), into which parts of the spheres (58) are rollably fitted, are provided on the inner face of a large diameter hole (38), the inner face of a restricting step (42), and the inner face of a small diameter hole (39), the guide grooves (126) having a concavely curved cross-sectional shape and extending in the axial direction of an insertion shaft (59). This enables an automatic parking brake state to be obtained by a simple structure without consuming power.

1 Claim, 8 Drawing Sheets

U.S. PATENT DOCUMENTS

| | | | |
|---|---|---|---|
| 4,723,636 A | 2/1988 | Lallier | |
| 5,056,954 A | 10/1991 | Flux et al. | |
| 5,662,020 A | 9/1997 | Morita et al. | |
| 5,954,162 A | 9/1999 | Feigel et al. | |
| 6,311,808 B1 | 11/2001 | Halasy-Wimmer et al. | |
| 6,659,236 B1 * | 12/2003 | Clark et al. | 188/79.52 |
| 7,434,669 B2 * | 10/2008 | Halasy-Wimmer et al. | 188/171 |
| 2007/0182242 A1 * | 8/2007 | Inagaki | 303/3 |
| 2007/0267255 A1 * | 11/2007 | Inagaki et al. | 188/72.4 |
| 2007/0278052 A1 | 12/2007 | Inagaki et al. | |

FOREIGN PATENT DOCUMENTS

| | | |
|---|---|---|
| DE | 19620344 | 8/1997 |
| JP | 50-106590 | 2/1975 |
| JP | 51-119470 | 10/1976 |
| JP | 53-52869 | 5/1978 |
| JP | 54-035565 | 3/1979 |
| JP | 54-60174 | 4/1979 |
| JP | 54-142770 | 10/1979 |
| JP | 55-27546 | 2/1980 |
| JP | 56-141207 | 11/1981 |
| JP | 62-37531 | 2/1987 |
| JP | 63-025809 | 2/1988 |
| JP | 02-134406 | 5/1990 |
| JP | 04-154468 | 5/1992 |
| JP | 08-004803 | 1/1996 |
| JP | 08-193605 | 7/1996 |
| JP | 09-108981 | 4/1997 |
| JP | 10-512947 | 12/1998 |
| JP | 2000-504811 | 4/2000 |
| JP | 2001-116018 | 4/2001 |
| JP | 2003-014015 | 1/2003 |
| WO | WO 2005/033541 | 4/2004 |
| WO | WO/2005/093282 | 10/2005 |

* cited by examiner

PARKING BRAKE SYSTEM

TECHNICAL FIELD

The present invention relates to a parking brake system and, in particular, to a parking brake system in which a parking brake state is obtained by locking a brake piston in its operating state.

BACKGROUND ART

Such a parking brake system is already known from, for example, Patent Publications 1 and 2.

Patent Publication 1: Japanese Patent Publication (PCT) No. 10-512947

Patent Publication 2: Japanese Patent Publication (PCT) No. 2000-504811

DISCLOSURE OF INVENTION

Problems to be Solved by the Invention

In Patent Publication 1, the brake piston is divided into front and rear brake pistons, a spring is provided in a compressed state between a transmission member abutting against the front end of the rear brake piston and a blocking plate fixed to the front brake piston, a latch capable of meshing with inner teeth cut into an inner face of a brake caliper to the rear of the front brake piston is housed within the brake caliper so as to engage with the inner teeth in a state in which the transmission member abuts against the front end of the rear brake piston but disengages from the inner teeth due to the urging force of the spring when the transmission member moves forward relative to the front end of the rear brake piston, and an auxiliary piston is slidably fitted into the rear brake piston, the auxiliary piston being capable of moving the transmission member in the axial direction relative to the rear brake piston. Since it is necessary to cut the inner teeth on the inner face of the brake caliper and house the latch within the brake caliper while dividing the brake piston into the front and rear brake pistons, the structure of the interior of the brake caliper is complicated.

Furthermore, in Patent Publication 2, an adjustment bolt having its front end part fixedly connected to the brake piston is screwed into an adjustment nut, an electromagnet exhibiting an electromagnetic force for making the adjustment nut frictionally engage with a casing is disposed within a brake caliper to the rear of the adjustment nut, and when obtaining a parking brake state, the electromagnet makes the adjustment nut frictionally engage with the casing in a state in which brake fluid pressure acts on the brake piston, thus preventing the brake piston from retreating. However, not only is it necessary to house the electromagnet within the brake caliper, thus making the structure complicated, but it is also necessary to maintain an energized state of a winding of the electromagnet in the parking brake state, thus increasing the power consumption.

The present invention has been accomplished under the above-mentioned circumstances, and it is an object thereof to provide a parking brake system that enables a parking brake state to be obtained by a simple structure without consuming power.

Means for Solving the Problems

In order to attain the above object, in accordance with a first aspect of the present invention, there is provided a parking brake system comprising: a parking piston slidably fitted into a casing so that a parking brake state can be obtained by forward movement in response to a parking control fluid pressure acting on a rear face side of the parking piston; a lock mechanism provided within the casing to the rear of the parking piston so as to automatically lock in response to forward movement of the parking piston in order to mechanically lock the parking piston at a forward position and unlock in response to a parking release control fluid pressure acting on the lock mechanism; a fluid pressure source; and fluid pressure control means for controlling a fluid pressure generated by the fluid pressure source so that the parking control fluid pressure and the parking release control fluid pressure can be obtained; the lock mechanism comprising a lock piston that is slidably fitted into the casing to the rear of the parking piston so that at least when the parking piston moves forward a forward urging force acts on the lock piston and that is arranged such that a parking release control pressure can act on the lock piston toward the rear, a cylindrical retaining tube that is integrally and coaxially connected to a rear part of the parking piston, spheres that are retained at a plurality of positions in the peripheral direction of the retaining tube so as to be able to move in a direction along the radial direction of the retaining tube, and an insertion shaft that is connected integrally to the front end of the lock piston so as to be axially relatively movably inserted into the retaining tube in order to sandwich the spheres between the insertion shaft and the inner face of the casing while contacting the spheres from the inside of the retaining tube and that can push the spheres radially outward when the lock piston moves to a forward position in response to forward movement of the parking piston from a retreat limit, the casing having provided therein, so as to surround the retaining tube, a large diameter hole on the front side with which the radially outwardly pushed spheres make contact, a small diameter hole on the rear side with which the spheres at a radially inner position make contact, and a restricting step that is disposed between the large diameter hole and the small diameter hole in order to restrict retreat of the spheres by abutting, from the rear, against the spheres in contact with the large diameter hole, and a plurality of guide grooves extending in the axial direction of the insertion shaft being provided on the inner face of the large diameter hole, the inner face of the restricting step, and the inner face of the small diameter hole, the guide grooves having a concavely curved cross-sectional shape with a diameter that is equal to or larger than the diameter of the spheres so that part of each sphere is rollably fitted into the guide groove.

Effects of the Invention

In accordance with the present invention, since making the parking control fluid pressure act on the rear face of the parking piston makes the parking piston move forward and the lock mechanism mechanically lock the forward position of the parking piston, it is possible to obtain a parking brake state automatically; furthermore, when releasing the parking brake state, the parking release control fluid pressure may be made to act on the lock mechanism, and it is possible to automatically obtain a parking brake state by a simple structure without consuming power in the parking brake state.

Furthermore, the lock mechanism includes the lock piston, which is slidably fitted into the casing to the rear of the parking piston so that a forward urging force acts on the lock piston when the parking piston moves forward and which is capable of making a parking release control fluid pressure act toward the rear on the lock piston, the cylindrical retaining tube, which is coaxially and integrally provided to the rear part of the parking piston, the spheres, which are retained at a plurality of positions in the peripheral direction of the retaining tube, and the insertion shaft, which is provided integrally with the front end of the lock piston in order to sandwich each of the spheres between itself and the inner face of the casing by contacting each of the spheres from the inside of the retaining tube; the insertion shaft is formed so as to push each of the spheres radially outward when the lock piston moves to the forward position in response to the parking piston moving forward from the retreat limit; and the casing is provided with the restricting step that is capable of abutting, from the rear, against the spheres pushed radially outward by the insertion shaft. Therefore, the lock piston moves forward when the parking piston moves forward, each of the spheres is thus pushed up by means of the insertion shaft, rearward movement of each of the spheres is restricted by the restricting step and by being sandwiched between the large diameter hole and the insertion shaft, and it is thereby possible to maintain a locked state. Moreover, by making the parking release control fluid pressure act on the lock piston so as to make the lock piston retreat it is possible to release the parking brake state.

Furthermore, since the plurality of guide grooves are provided on the inner faces of the large diameter hole, the restricting step, and the small diameter hole of the casing so as to extend in the axial direction, the guide grooves having a concavely curved cross-sectional shape with a diameter that is equal to or larger than the diameter of the sphere so that part of each sphere is rollably fitted into the groove, it is possible to make the contact area between the sphere and the casing relatively large, and relieve the stress acting on the sphere and the casing in a locked state.

EXPLANATION OF REFERENCE NUMERALS AND SYMBOLS

10A, 10B Pump as Fluid Pressure Source
23 Casing
31 Lock Mechanism
38 Second Slide Hole as Large Diameter Hole
39 Guide Hole as Small Diameter Hole
42 Restricting Step
44 Parking Piston
56 Lock Piston
57 Retaining Tube
58 Sphere
59 Insertion Shaft
105A, 105B Fluid Pressure Control Means
126 Guide Groove
M Master Cylinder as Fluid Pressure Source

BEST MODE FOR CARRYING OUT THE INVENTION

A mode for carrying out the present invention is explained below by reference to one embodiment of the present invention shown in the attached drawings.

Embodiment 1

FIG. 1 to FIG. 8 show one embodiment of the present invention.

Figure 1:
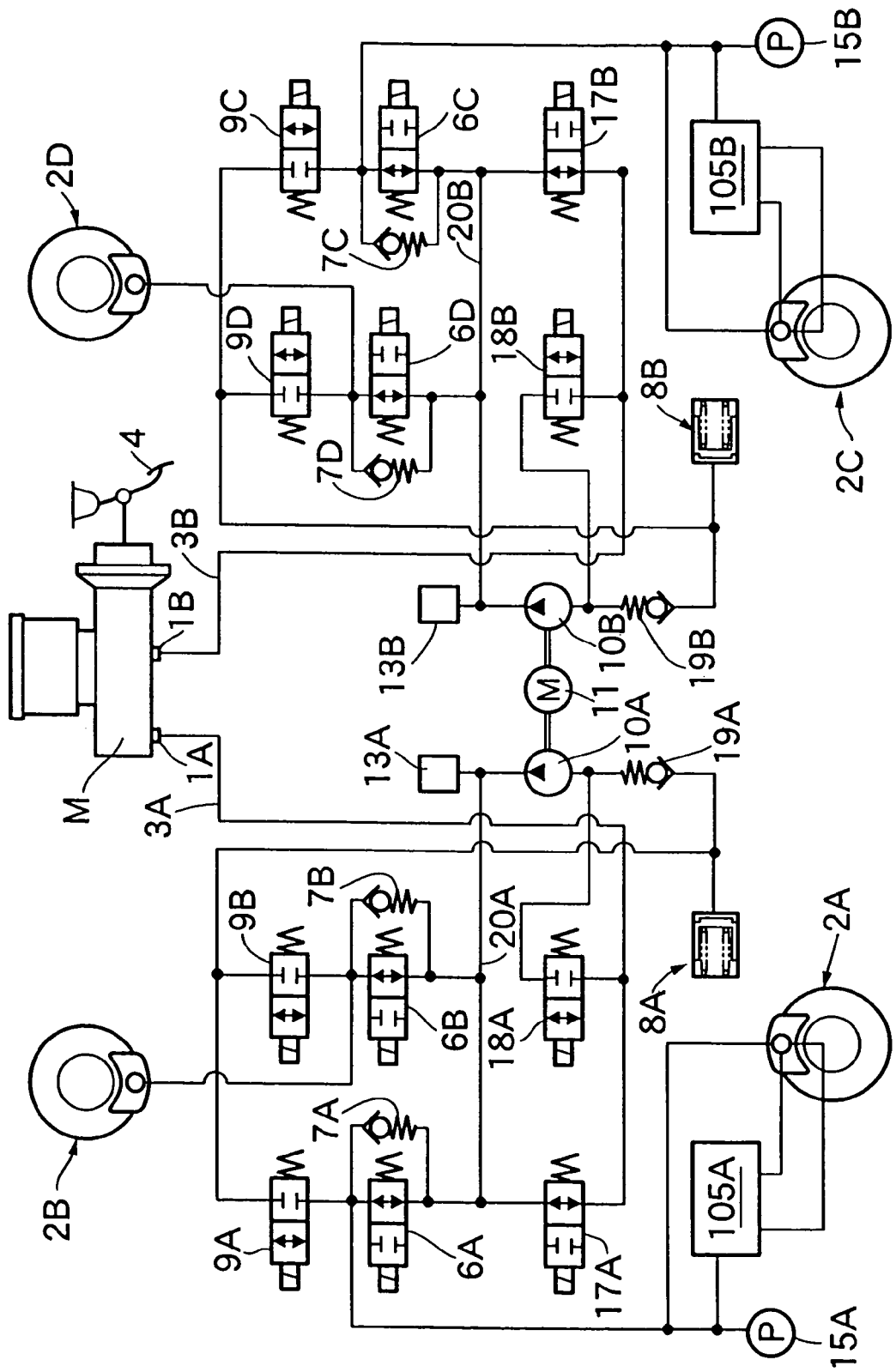
FIG. 1 is a fluid pressure circuit diagram of a vehicle brake system (first embodiment).

Referring first to FIG. 1, a tandem type master cylinder M includes first and second output ports 1A and 1B for generating a brake fluid pressure according to a depressing force that is applied by a vehicle driver to a brake pedal 4; the first output port 1A is connected to a first output fluid pressure line 3A, and the second output port 1B is connected to a second output fluid pressure line 3B.

The first output fluid pressure line 3A is connected to a first fluid pressure line 20A via a cut valve 17A, which is a normally open solenoid valve, and the second output fluid pressure line 3B is connected to a second fluid pressure line 20B via a cut valve 17B, which is a normally open solenoid valve.

The first fluid pressure line 20A is connected to a front left wheel brake 2A, which is a disk brake equipped with a parking brake mechanism, via an inlet valve 6A, which is a normally open solenoid valve, and is also connected to a rear right wheel brake 2B, which is a disk brake, via an inlet valve 6B, which is a normally open solenoid valve. Furthermore, the second fluid pressure line 20B is connected to a front right wheel brake 2C, which is a disk brake equipped with a parking brake mechanism, via an inlet valve 6C, which is a normally open solenoid valve, and is also connected to a rear left wheel brake 2D, which is a disk brake, via an inlet valve 6D, which is a normally open solenoid valve. Moreover, the inlet valves 6A to 6D are connected in series to check valves 7A to 7D respectively.

Provided between a first reservoir 8A, which corresponds to the first fluid pressure line 20A, and the front left wheel brake 2A and rear right wheel brake 2B are outlet valves 9A and 9B respectively, which are normally closed solenoid valves, and provided between a second reservoir 8B, which corresponds to the second fluid pressure line 20B, and the front right wheel brake 2C and rear left wheel brake 2D are outlet valves 9C and 9D respectively, which are normally closed solenoid valves.

The first and second reservoirs 8A and 8B are connected to intake sides of first and second pumps 10A and 10B driven by a common electric motor 11 via one-way valves 19A and 19B that allow the flow of brake fluid to the pumps 10A and 10B. The first and second output fluid pressure lines 3A and 3B are connected to points between the first and second pumps 10A and 10B and the one-way valves 19A and 19B via suction valves 18A and 18B, which are normally closed solenoid valves, and the first and second fluid pressure lines 20A and 20B are connected to discharge sides of the first and second pumps 10A and 10B via first and second dampers 13A and 13B.

At a time of normal braking when there is no possibility of the wheels locking, each of the inlet valves 6A to 6D is put into a de-energized valve-open state, each of the outlet valves 9A to 9D is put into a de-energized valve-closed state, and the brake fluid pressure outputted from the first output port 1A of the master cylinder M acts on the front left wheel and rear right wheel brakes 2A and 2B via the inlet valves 6A and 6B. Furthermore, the brake fluid pressure outputted from the second output port 1B of the master cylinder M acts on the front right wheel and rear left wheel brakes 2C and 2D via the inlet valves 6C and 6D.

When a wheel nearly comes into a locked state during the above-mentioned braking, among the inlet valves 6A to 6D, the inlet valve corresponding to the wheel that has nearly come into the locked state is energized and closed, and among the outlet valves 9A to 9D, the outlet valve corresponding to the above wheel is energized and opened. Part of the brake fluid pressure on the wheel that has nearly come into the locked state is thereby absorbed by the first reservoir 8A or the second reservoir 8B, and the brake fluid pressure on the wheel that has nearly come into the locked state is reduced.

Furthermore, when maintaining the brake fluid pressure at a constant level, the inlet valves 6A to 6D are energized and closed and the outlet valves 9A to 9D are de-energized and closed and, moreover, when increasing the brake fluid pressure, the inlet valves 6A to 6D may be put into a de-energized valve-open state, and the outlet valves 9A to 9D may be put into a de-energized valve-closed state.

Controlling the de-energization/energization of each of the inlet valves 6A to 6D and each of the outlet valves 9A to 9D in this way enables the wheels to be braked efficiently without being locked.

During the above-mentioned antilock brake control, the electric motor 11 is rotationally operated, the first and second pumps 10A and 10B are driven accompanying the operation of the electric motor 11, and the brake fluid absorbed by the first and second reservoirs 8A and 8B is therefore taken into the first and second pumps 10A and 10B and then circulated to the first and second output fluid pressure lines 3A and 3B via the first and second dampers 13A and 13B. Due to such circulation of the brake fluid, it is possible to prevent any increase in the amount by which the brake pedal 4 is depressed due to the first and second reservoirs 8A and 8B absorbing the brake fluid. Moreover, pulsation of the discharge pressure of the first and second pumps 10A and 10B is suppressed by operation of the first and second dampers 13A and 13B, and the above circulation does not impair the operational feel of the brake pedal 4.

By operating the electric motor 11 in a state in which the suction valves 18A and 18B are energized and opened and the cut valves 17A and 17B are energized and closed, the first and second pumps 10A and 10B take in the brake fluid from the master cylinder M side and discharge pressurized brake fluid into the first and second fluid pressure lines 20A and 20B.

Furthermore, pressure sensors 15A and 15B for detecting brake fluid pressure are connected to the front left wheel and front right wheel brakes 2A and 2C.

Figure 2:
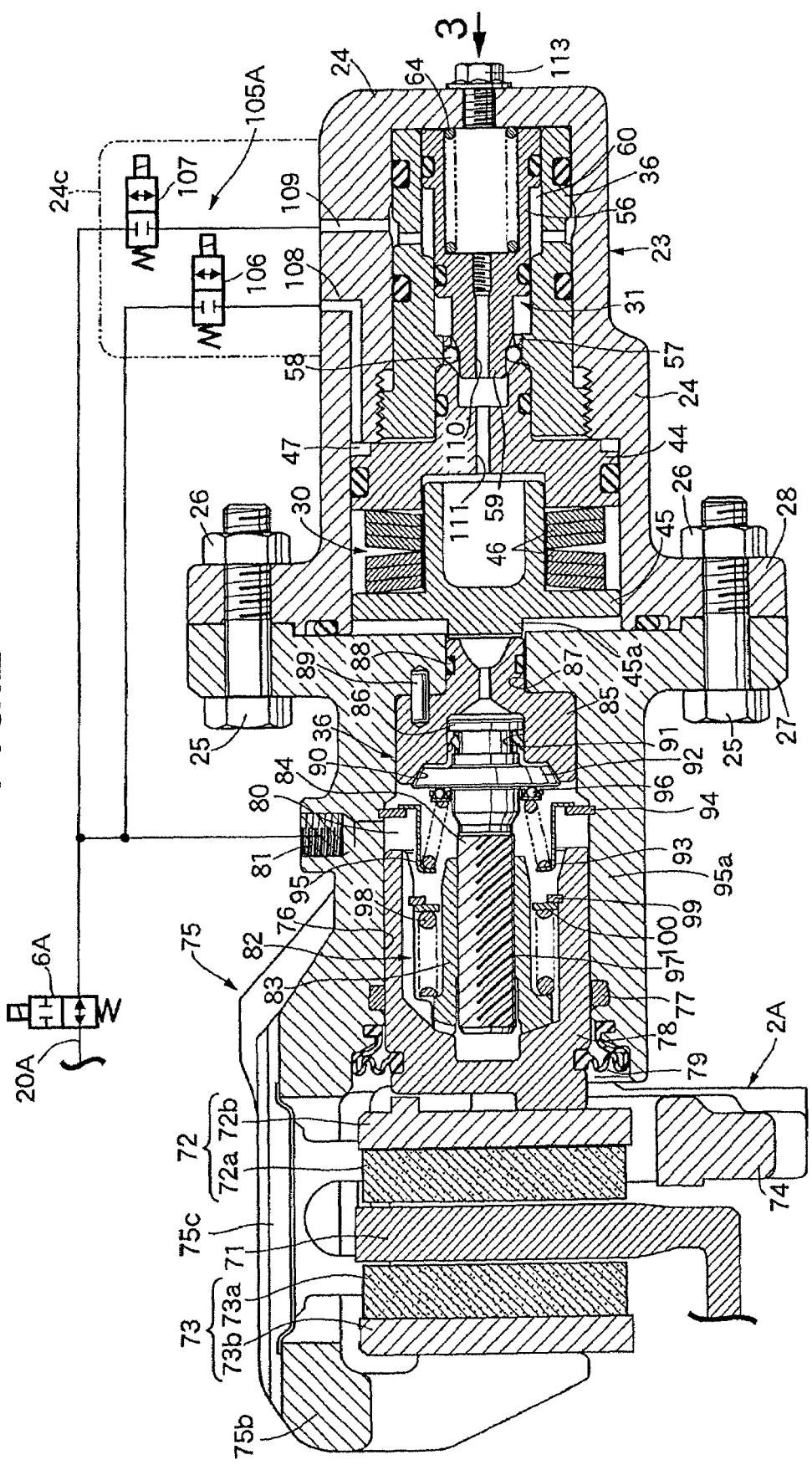
FIG. 2 is a longitudinal sectional view of a front left wheel brake at a time of non-parking braking (first embodiment).

In FIG. 2, in the front left wheel brake 2A, which is the disk brake equipped with the parking brake mechanism, a first friction pad 72 and a second friction pad 73 are disposed so as to oppose each other on opposite sides of a brake disk 71 that rotates together with the wheel. These first and second friction pads 72 and 73 are formed from linings 72a and 73a that can abut against the brake disk 71, and back plates 72b and 73b fixed to rear faces of the linings 72a and 73a, and the back plates 72b and 73b are supported, so that they can move freely in the axial direction of a brake piston 78, on a bracket 74 fixed to a vehicle body. Furthermore, a brake caliper 75 straddling the first and second friction pads 72 and 73 is supported on the bracket 74 so that it can move freely in the axial direction of the brake piston 78.

The brake caliper 75 includes a first clamping arm 75a facing the back plate 72b of the first friction pad 72 and a second clamping arm 75b facing the back plate 73b of the second friction pad 73, and the first and second clamping arms 75a and 75b are integrally connected via a bridging part 75c running past an outer peripheral part of the brake disk 71. A cylinder hole 76 is provided in the first clamping arm 75a, and the brake piston 78, which has a cup shape, is slidably fitted into the cylinder hole 76 via a seal 77. A forward end part of the brake piston 78 facing the back plate 72b of the first friction pad 72 so as to be able to abut thereagainst is connected to an open end of the cylinder hole 76 by a bellows-shaped dust cover 79; furthermore, a brake fluid pressure chamber 80 is formed within the first clamping arm 75a, the rear face of brake piston 78 facing the brake fluid pressure chamber 80, and the brake fluid pressure chamber 80 is connected to the inlet valve 6A via a port 81 provided in the first clamping arm 75a.

An adjustment mechanism 82 is provided within the first clamping arm 75a of the brake caliper 75, and this adjustment mechanism 82 includes an adjustment nut 83, an adjustment bolt 84, a relay piston 85, and a small piston 86, the adjustment nut 83 being connected to the brake piston 78 so that relative rotation is not possible and housed within the brake fluid pressure chamber 80, the adjustment bolt 84 having its front end part screwed into the adjustment nut 83, the relay piston 85 being disposed in a rear part of the brake fluid pressure chamber 80 and slidably fitted into the brake caliper 75 in a fluid-tight manner so that it cannot rotate around the axis but can move in the axial direction, and the small piston 86 being connected integrally and coaxially to a rear part of the adjustment bolt 84, slidably fitted into the relay piston 85 in a fluid-tight manner, and resiliently urged in a direction in which it frictionally engages with the relay piston 85.

A relay cylinder hole 87 having a smaller diameter than that of the cylinder hole 76 is provided coaxially in an end part, on the side opposite to the brake disk 71, of the first clamping arm 75a of the brake caliper 75, and a stepped rear part of the relay piston 85 is slidably fitted into the relay cylinder hole 87 via a seal 88 while a front part of the relay piston 85 is inserted into a rear part of the cylinder hole 76. Moreover, opposite end parts of a restricting pin 89 are fitted into the brake caliper 75 and the relay piston 85, the restricting pin 89 being disposed at a position offset from the axis of the cylinder hole 76 so as to have an axis that is parallel to the cylinder hole 76 and the relay cylinder hole 87. The relay piston 85 is thereby prevented from rotating around an axis that is coaxial with the cylinder hole 76 and the relay cylinder hole 87 and is supported by the brake caliper 75 so that it can move along the axis.

A small cylinder hole 91 is coaxially provided in the relay piston 85, the small cylinder hole 91 having a tapered clutch face 90 in an opening at the front end. A movable clutch body 92 and the small piston 86 are coaxially and integrally connected to a rear part of the adjustment bolt 84, the movable clutch body 92 being capable of frictionally engaging with the clutch face 90, and the small piston 86 being slidably fitted into the small cylinder hole 91 in a fluid-tight manner.

One end of a clutch spring 93 exhibiting a spring force for frictionally engaging the movable clutch body 92 with the clutch face 90 of the relay piston 85 abuts against a retainer 95 engaged with and supported by a clip 94 mounted on an inner face of the cylinder hole 76, and the other end of the clutch spring 93 abuts against the movable clutch body 92 via a ball bearing 96.

The adjustment nut 83 and the adjustment bolt 84 mesh with each other by means of a steep thread 97 having a plurality of threads and grooves having a coarse pitch. One end of an over-adjustment prevention spring 98 exhibiting a spring force urging the adjustment nut 83 toward the brake piston 78 abuts against the adjustment nut 83, and the other end of the over-adjustment prevention spring 98 abuts against and is supported by a retainer 100 engaged with and supported by a clip 99 mounted on an inner face of the brake piston 78.

The adjustment nut 83 and the brake piston 78 are unable to rotate relative to each other due to interlocking of the abutment parts thereof, and the back plate 72b of the first friction pad 72 and the brake piston 78 are unable to rotate relative to each other due to interlocking thereof.

In such an adjustment mechanism 82, when a fluid pressure is supplied to the brake fluid pressure chamber 80 at a time of normal braking, the brake piston 78, which has received the fluid pressure, moves leftward in FIG. 2 within the cylinder hole 76 while elastically deforming the seal 77, and presses the first friction pad 72 against one side of the brake disk 71; due to its reaction the brake caliper 75 moves rightward, which is a direction opposite to the direction in which the brake piston 78 has moved, and the second clamping arm 75b presses the second friction pad 73 against the other side of the brake disk 71. As a result, the first and second friction pads 72 and 73 abut against opposite sides of the brake disk 71 with an equal surface pressure, thus generating a braking force for braking the wheel.

During the above braking, the fluid pressure supplied to the brake fluid pressure chamber 80 does not generate an axial load on the adjustment nut 83, but generates a rightward load on the movable clutch body 92 integral with the adjustment bolt 84 meshing with the adjustment nut 83, the rightward load having a magnitude corresponding to the product of the cross-sectional area of the small piston 86 and the above fluid pressure, and a frictional engagement force according to the load acts between the movable clutch body 92 and the clutch face 90 of the relay piston 85.

When braking normally, since the fluid pressure acting on the brake fluid pressure chamber 80 is relatively small, the frictional engagement force acting between the movable clutch body 92 and the relay piston 85 is also relatively small. Because of this, when the brake piston 78 moves forward accompanying the progress of wear of the linings 72a and 73a of the first and second friction pads 72 and 73, the adjustment nut 83 moves forward together with the brake piston 78 due to the resilient force of the over-adjustment prevention spring 98, and the movable clutch body 92 integral with the adjustment bolt 84 meshing with the adjustment nut 83 is detached from the clutch face 90 of the relay piston 85 against the fluid pressure acting on the brake fluid pressure chamber 80 and the resilient force of the clutch spring 93.

When the movable clutch body 92 detaches from the clutch face 90 of the relay piston 85, the adjustment bolt 84, which is urged rightward by the fluid pressure acting on the movable clutch body 92 and the resilient force of the clutch spring 93, moves to the right while rotating in the steep thread 97 relative to the adjustment nut 83, which is unable to rotate, and the movable clutch body 92 re-engages with the clutch face 90 of the relay piston 85. In this process, the movable clutch body 92 can rotate smoothly due to the action of the ball bearing 96 disposed between the movable clutch body 92 and the clutch spring 93.

In this way, accompanying the progress of wear of the linings 72a and 73a of the first and second friction pads 72 and 73, the adjustment nut 83 moves to the left relative to the adjustment bolt 84 so as to compensate for the amount of wear, and it is therefore possible to automatically maintain a constant clearance between the brake disk 71 and the linings 72a and 73a of the first and second friction pads 72 and 73 when not braking.

When the fluid pressure acting on the brake fluid pressure chamber 80 is decreased in order to release the braking state, although the brake piston 78 retreats due to the deformation restoration force of the seal 77, since the retreating force makes the movable clutch body 92 engage with the clutch face 90 of the relay piston 85 via the adjustment nut 83 and the adjustment bolt 84, rotation of the adjustment bolt 84 relative to the adjustment nut 83 is restricted. The brake piston 78 therefore can only retreat by a stroke corresponding to the backlash between the adjustment nut 83 and the adjustment bolt 84, thereby giving an appropriate clearance, corresponding to the above backlash, between the first and second friction pads 72 and 73 and the brake disk 71.

When hard braking is carried out, the above-mentioned automatic adjustment is carried out until the fluid pressure of the brake fluid pressure chamber 80 increases up to a predetermined value that deforms the brake caliper 75, and when the fluid pressure exceeds the predetermined value, since the movable clutch body 92 is pressed firmly against the clutch face 90 of the relay piston 85 due to the fluid pressure, the movable clutch body 92 and the relay piston 85 are joined so that they cannot rotate relative to each other. As a result, since the adjustment bolt 84 is restrained so that it can not rotate, and the adjustment nut 83, which is intrinsically unable to rotate, remains on the adjustment bolt 84, when the brake piston 78 moves further forward accompanying elastic deformation of the brake caliper 75 due to the fluid pressure, it is only the brake piston 78 that moves forward while compressing the over-adjustment prevention spring 98, leaving the adjustment nut 83 behind. In this way, when hard braking is carried out, over-adjustment between the adjustment nut 83 and the adjustment bolt 84 is prevented.

Figure 3:
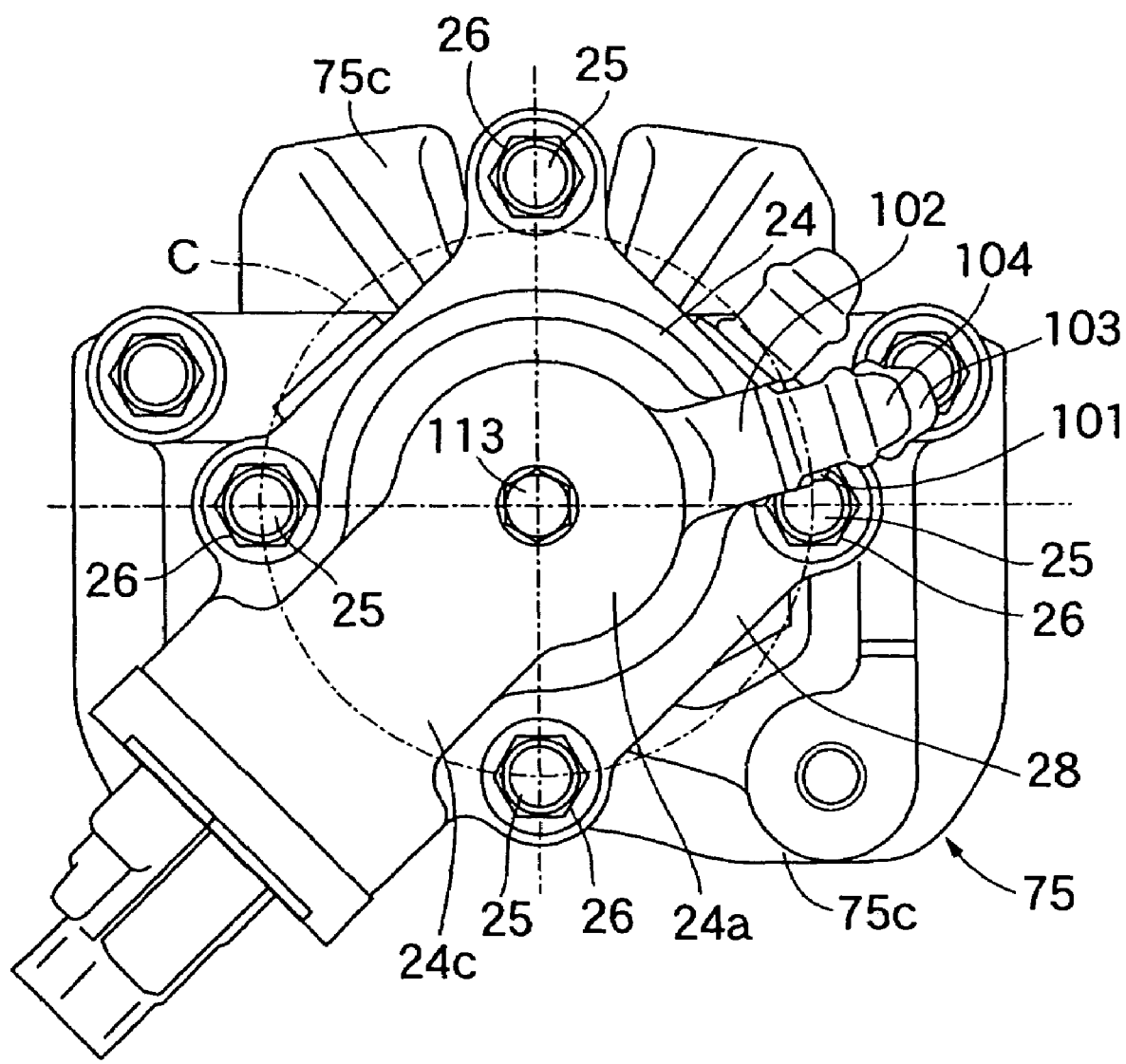
FIG. 3 is a view from arrow 3 in FIG. 2 (first embodiment).

Referring in addition to FIG. 3, a casing 23 formed from a bottomed cylindrical casing main body 24 having an end wall 24a at the rear end on the side opposite to the front left wheel brake 2A and a cylindrical sleeve 36 fitted into and fixed to the casing main body 24 is secured to the first clamping arm 75a of the brake caliper 75 by means of a plurality of, for example, four, bolts 25 and nuts 26 screwed around the bolts 25. That is, a flange 27 integrally provided on the first clamping arm 75a and a flange 28 integrally provided at the front end part of the casing main body 24 are secured by means of the bolts 25 and the nuts 26.

Moreover, three of the four bolts 25 are disposed on an imaginary circle C on a plane orthogonal to the axis of the cylinder hole 76 with the axis of the cylinder hole 76 as a center, and the remaining one bolt 25 is disposed at a position offset from the imaginary circle C; this arrangement for the bolts 25 allows the casing 23 to be secured to the first clamping arm 75a of the brake caliper 75 at a fixed relative position around the axis of the cylinder hole 76.

Provided within the casing 23 are a parking operation mechanism 30 and a lock mechanism 31, the parking operation mechanism 30 enabling a parking brake state of the front left wheel brake 2A to be obtained in response to the action of a parking control fluid pressure, and the lock mechanism 31 being disposed to the rear of the parking operation mechanism 30 so as to mechanically lock a parking operation state of the parking operation mechanism 30 and unlock in response to the action of a parking release control fluid pressure.

Figure 4:
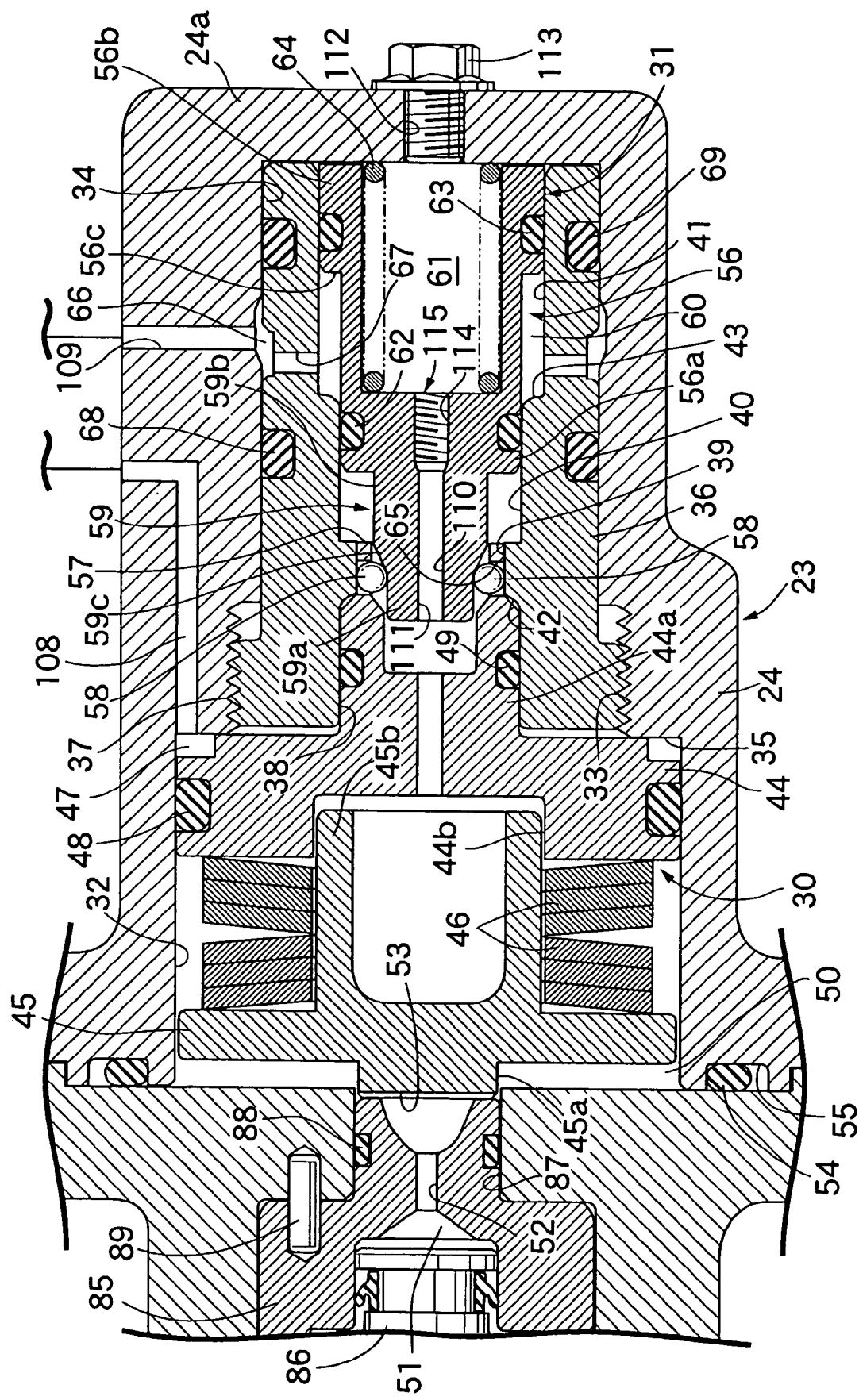
FIG. 4 is an enlarged view of an essential part in FIG. 2 (first embodiment).

Referring in addition to FIG. 4, formed within the casing main body 24 are a first slide hole 32, a screw hole 33, and a mounting hole 34, the first slide hole 32 being formed so as to have a diameter larger than that of the relay cylinder hole 87 while having its front end facing the rear end of the relay cylinder hole 87, the screw hole 33 having a diameter smaller than that of the first slide hole 32 and being coaxially connected to the rear end of the first slide hole 32, the mounting hole 34 having a diameter smaller than that of the screw hole 33, being coaxially connected to the rear end of the screw hole 33, and having its rear end closed by the end wall 24a of the casing 24, and an annular step 35 being formed between the first slide hole 32 and the screw hole 33 so as to face forward.

The cylindrical sleeve 36 is fitted into the mounting hole 34, and a male thread portion 37 provided on the front end outer periphery of the sleeve 36 is screwed into the screw hole 33 so that the rear end of the sleeve 36 abuts against the end wall 24a, thereby allowing the sleeve 36 to be fixed within the casing main body 24 while having the front end of the sleeve 36 disposed to the rear of the step 35.

Formed in this sleeve 36 are a second slide hole 38, a guide hole 39, a third slide hole 40, and a fourth slide hole 41, the second slide hole 38 having a diameter smaller than that of the first slide hole 32 and being coaxially connected to the rear end of the first slide hole 32, the guide hole 39 having a diameter smaller than that of the second slide hole 38 and being coaxially connected to the rear end of the second slide hole 38, the third slide hole 40 having a diameter larger than that of the guide hole 39 and being coaxially connected to the rear end of the guide hole 39, and the fourth slide hole 41 having a diameter larger than that of the third slide hole 40 and being coaxially connected to the rear end of the third slide hole 40, a forward-facing tapered restricting step 42 being formed between the second slide hole 38 and the guide hole 39, and a rearward-facing annular step 43 being formed between the third and fourth slide holes 40 and 41.

The parking operation mechanism 30 is formed from a parking piston 44 slidably fitted into the first slide hole 32, a push piston 45 axially slidably housed in the first slide hole 32 in front of the parking piston 44, and a plurality of dish springs 46 disposed between the parking piston 44 and the push piston 45.

A small diameter portion 44a is coaxially and integrally provided at the rear end of the parking piston 44, the small diameter portion 44a being slidably fitted into the second slide hole 38, an annular parking control fluid pressure chamber 47 for making a parking control fluid pressure act on a rear face of the parking piston 44 is formed between the step 35 of the casing main body 24 of the casing 23 and the rear end of the parking piston 44, and annular seals 48 and 49 for sealing the parking control fluid pressure chamber 47 from opposite sides in the axial direction are mounted on the outer periphery of the parking piston 44 and the outer periphery of the small diameter portion 44a of the parking piston 44. A push projection 45a, which is inserted into the relay cylinder hole 87, is projectingly provided integrally with the front end of the push piston 45 so as to abut against the rear end of the relay piston 85.

A recess 44b is provided in a central part of the front end of the parking piston 44, and an tubular insertion portion 45b, which is inserted into the recess 44b, is provided coaxially and integrally with a central part of the rear end of the push piston 45. Moreover, the outer diameter of the tubular insertion portion 45b is set to be smaller than the inner diameter of the recess 44b so as to allow radial displacement of the push piston 45 relative to the parking piston 44, and the outer diameter of the push piston 45 is also set to be smaller than the inner diameter of the first slide hole 32 so that the tubular insertion portion 45b does not come to contact with the inner face of the first slide hole 32 even when the tubular insertion portion 45b undergoes relative displacement in the radial direction within the recess 44b.

The free length of the dish springs 46 is set at a value such that a spring load cannot be exhibited when the parking piston 44 is at a retreat limit while making the volume of the parking control fluid pressure chamber 47 a minimum, and in this state at least one portion of the tubular insertion portion 45b is inserted into the recess 44b.

In this way, the parking piston 44 and the push piston 45, which sandwich the plurality of dish springs 46, are connected in the axial direction while allowing relative displacement in the radial direction, and assembling of the parking operation mechanism 30 within the casing 23 becomes easy.

An air chamber 50 is formed within a front part of the casing main body 24 of the casing 23, the front end of the parking piston 44 facing the air chamber 50, and the push piston 45 and the dish springs 46 are housed in the air chamber 50. Furthermore, a small air chamber 51 is formed between the relay piston 85 and the small piston 86, which is slidably fitted in a fluid-tight manner into the relay piston 85, and in order to prevent relative axial movement between the relay piston 85 and the small piston 86 from being accompanied by an increase or decrease in the pressure of the small air chamber 51, the relay piston 85 is provided with an air passage 52 with its front end communicating with the small air chamber 51 and its rear end opening at the rear end of the relay piston 85. A groove 53 for providing communication between the air passage 52 and the air chamber 50 is provided on a front end face of the push projection 45a, which is provided integrally with the front end of the push piston 45 so as to abut against the rear end of the relay piston 85.

The first arm part 75a of the brake caliper 75 and the casing main body 24 of the casing 23 are secured by the plurality of bolts 25 and nuts 26, and an O ring 54 is disposed between joining faces of the first arm part 75a and the casing main body 24, the O ring 54, which is for cutting off the air chamber 50 from the exterior, being formed from an elastic material.

Moreover, the O ring 54 is mounted in an annular groove 55 provided in at least one of the first arm part 75a and the casing main body 24, for example, the casing main body 24; this annular groove 55 is formed so as to allow the O ring 54 to expand and contract accompanying a change in the volume of the air chamber 50 in response to axial movement of the parking piston 44, and the O ring 54 absorbs a change in the volume of the air chamber 50.

Figure 5:
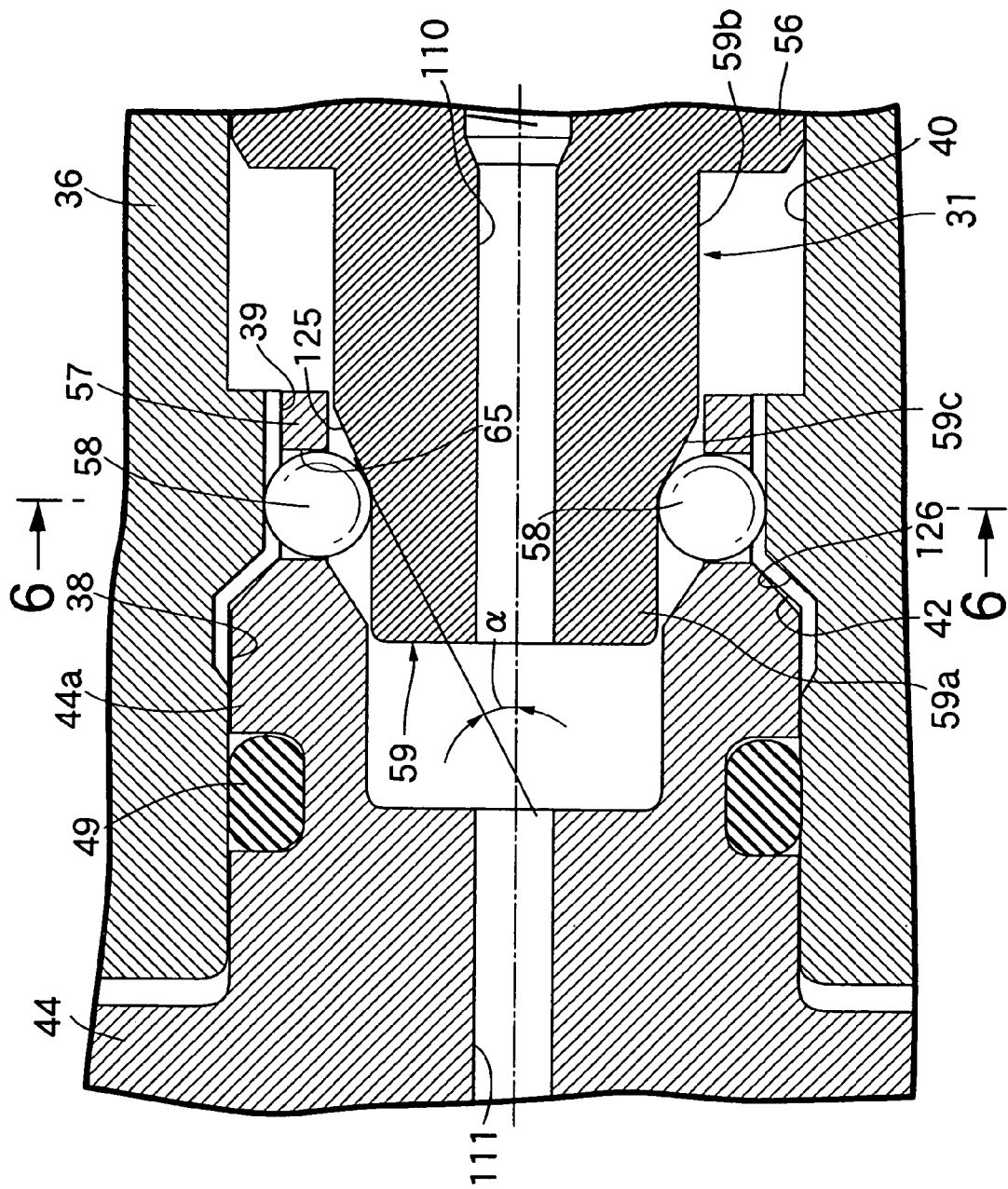
FIG. 5 is an enlarged view of a part in FIG. 4 (first embodiment).
Figure 6:
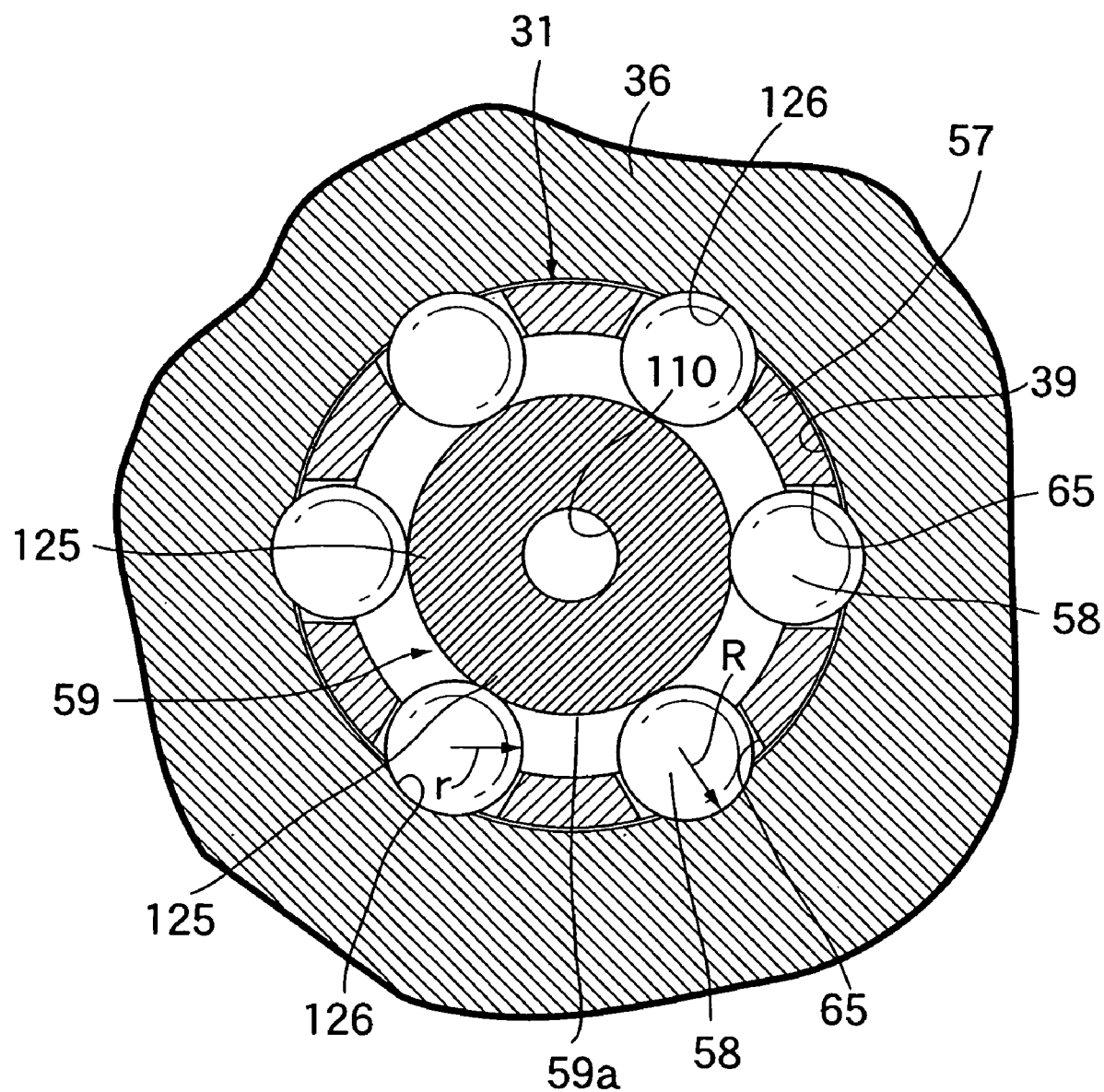
FIG. 6 is a sectional view along line 6-6 in FIG. 5 (first embodiment).

Referring in addition to FIG. 5 and FIG. 6, the lock mechanism 31 includes a lock piston 56, a cylindrical retaining tube 57, a plurality of spheres 58, and an insertion shaft 59, the lock piston 56 being slidably fitted into the third and fourth slide holes 40 and 41 of the sleeve 36 to the rear of the parking piston 44 so that a forward urging force acts thereon when the parking piston 44 moves forward and enabling a parking release control fluid pressure to act thereon toward the rear, the cylindrical retaining tube 57 being integrally and coaxially connected to the small diameter portion 44a, which is integral with a rear part of the parking piston 44, the spheres 58 being retained at a plurality of positions along the peripheral direction of the retaining tube 57 so as to be able to move in a direction along the radial direction of the retaining tube 57, and the insertion shaft 59 being integrally connected to the front end of the lock piston 56 so as to be axially relatively movably inserted into the retaining tube 57 so as to sandwich the spheres 58 between itself and the inner face of the sleeve 36 by contacting the spheres 58 from the inside of the retaining tube 57.

The lock piston 56 integrally includes a small diameter portion 56a slidably fitted into the third slide hole 40, and a large diameter portion 56b coaxially connected to a rear part of the small diameter portion 56a while forming a forward facing annular step 56c between itself and a rear part of the small diameter portion 56a and slidably fitted into the fourth slide hole 41.

An annular parking release control fluid pressure chamber 60 is formed between the step 56c of the lock piston 56 and the step 43 of the sleeve 36 in the casing 23 between the lock piston 56 and the sleeve 36, the front face of the lock piston 56 facing the annular parking release control fluid pressure chamber 60, and a spring chamber 61 is formed between the lock piston 56 and the end wall 24a of the casing main body 24 in the casing 23.

Annular seals 62 and 63 are mounted on the outer periphery of the small diameter portion 56a and the outer periphery of the large diameter portion 56b of the lock piston 56, the annular seals 62 and 63 sealing the parking release control fluid pressure chamber 60 from opposite sides in the axial direction and being in sliding contact with the third and fourth slide holes 39 and 40.

An annular chamber 66 is formed between the casing main body 24 and the outer periphery of the sleeve 36 in the casing 23 in a portion corresponding to the parking release control fluid pressure chamber 60, the sleeve 36 is provided with a plurality of through holes 67 that provide communication between the annular chamber 66 and the parking release control fluid pressure chamber 60, and a pair of annular seals 68 and 69 with the annular chamber 66 interposed therebetween are mounted on the outer periphery of the sleeve 36 so as to come into resilient contact with the inner face of the mounting hole 34 of the casing main body 24.

A spring 64 is provided in a compressed state between the end wall 24a of the casing main body 24 and the lock piston 56, and the lock piston 56 is resiliently urged forward by the spring force of the spring 64. Moreover, the spring load of the spring 64 is set to be smaller than the spring load of the clutch spring 93 of the adjustment mechanism 82.

The retaining tube 57 is formed so as to have an outer diameter that allows it to be inserted into the guide hole 39 of the sleeve 36, retaining holes 65 are provided at a plurality of positions spaced in the peripheral direction of the retaining tube 57, and the spheres 58 are inserted into and retained by these retaining holes 65.

The insertion shaft 59 is formed by coaxially and integrally connecting a small diameter shaft portion 59a on the front side and a large diameter shaft portion 59b via a tapered portion 59c that changes the contact position of each of the spheres 58 from the small diameter shaft portion 59a to the large diameter shaft portion 59b in response to forward movement of the lock piston 56, the small diameter shaft portion 59a positioning the spheres 58 on the radially inner side when the parking piston 44 is at a retreat limit, and the large diameter shaft portion 59b positioning the spheres 58 on the radially outer side when the lock piston 56 moves to a forward position in response to the parking piston 44 moving forward from the retreat limit.

Moreover, the tapered portion 59c, which has the function of pushing up the spheres 58 from the radially inner position where they are in contact with the small diameter shaft portion 59a to the radially outer position where they are in contact with the large diameter shaft portion 59b, is set so as to have an angle α relative to the axis of the insertion shaft 59 of 20 to 60 degrees.

Figure 7:
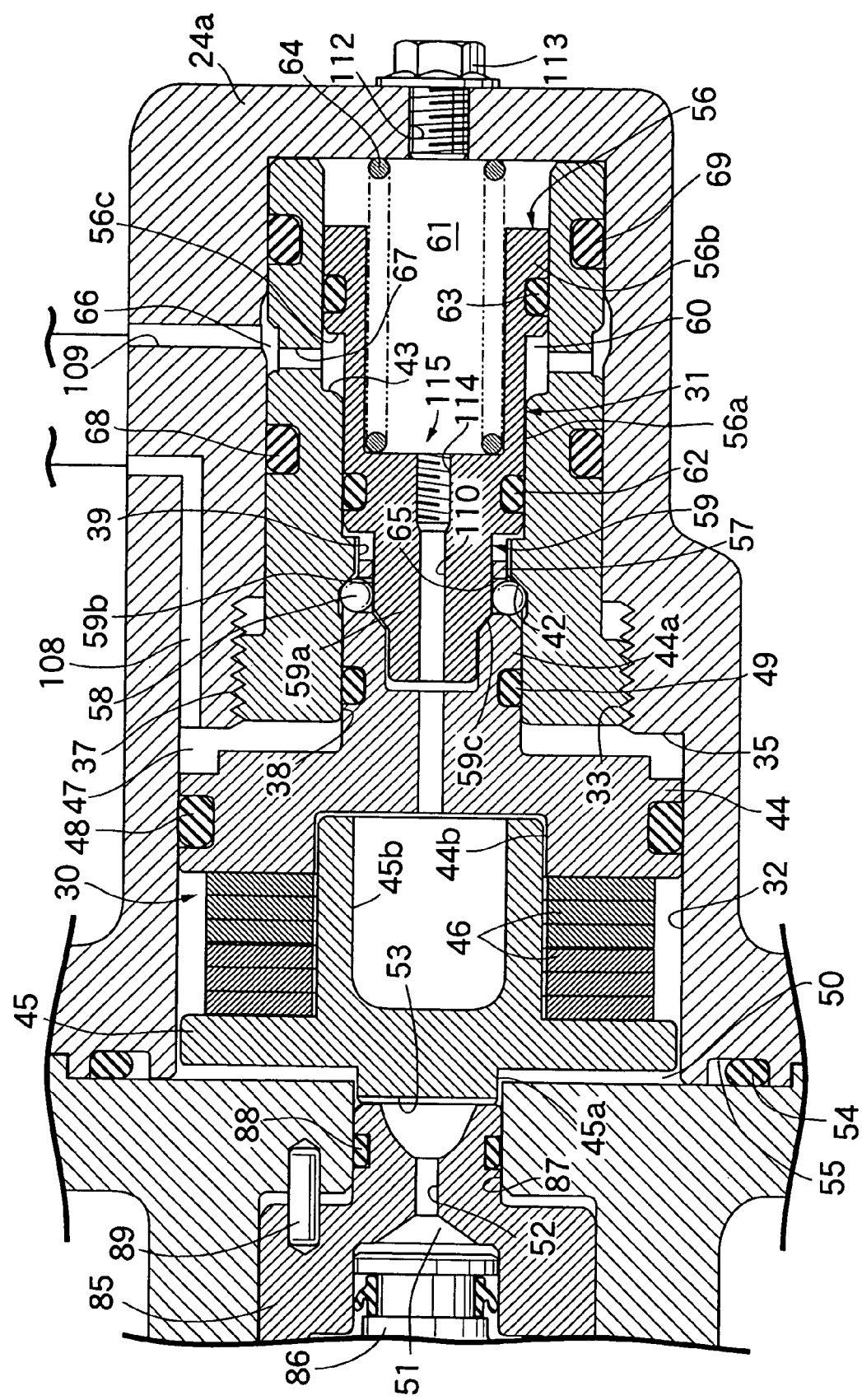
FIG. 7 is a longitudinal sectional view, corresponding to FIG. 2, in a parking brake state (first embodiment).

As shown in FIG. 7, when the parking piston 44 moves forward from the retreat limit, and in response thereto the lock piston 56 is moved forward by the spring force of the spring 64, from being in contact with the small diameter shaft portion 59a of the insertion shaft 59 the spheres 58 come into contact with the large diameter shaft portion 59b via the tapered portion 59c; in this process the retaining tube 57 moves forward to a position where the spheres 58 come into contact with the inner face of the second slide hole 38 as a large diameter hole that has a larger diameter than that of the guide hole 39, which is a small diameter hole, and the spheres 58, which are pushed upward by the large diameter shaft portion 59b, abut against the restricting step 42 positioned between the second slide hole 38 and the guide hole 39, thereby restricting rearward movement. That is, retreat of the retaining tube 57 retaining the spheres 58, that is, the parking piston 44, is restricted.

Furthermore, a plurality of guide grooves 126 extending in the axial direction of the insertion shaft 59 are provided on an area of the inner face of the second slide hole 38 with which the spheres 58 make contact, the inner face of the restricting step 42, and the inner face of the guide hole 39 so that parts of the spheres 58 are rollably fitted into the guide grooves 126, each of the guide grooves 126 having a cross-sectional shape that is concavely curved with a radius R that is equal to or larger than a radius r of the spheres 58.

The parking control fluid pressure that is made to act on the parking control fluid pressure chamber 47 and the parking release control fluid pressure that is made to act on the parking release control fluid pressure chamber 60 are obtained by controlling, using fluid pressure control means 105A, the fluid pressure discharged from the first pump 10A, which is driven by the electric motor 11 so as to function as a fluid pressure source, this fluid pressure control means 105A including a first normally closed solenoid valve 106 disposed between the inlet valve 6A and a fluid pressure line 108 provided in the casing main body 24 so as to communicate with the parking control fluid pressure chamber 47, and a second normally closed solenoid valve 107 disposed between the inlet valve 6A and a fluid pressure line 109 provided in the casing main body 24 so as to communicate with the annular chamber 66 connected to the parking release control fluid pressure chamber 60, and this fluid pressure control means 105A is housed within a protruding portion 24b that is provided integrally with the casing main body 24 of the casing 23 and protrudes sideways from the casing main body 24.

Furthermore, a bleeder tube 101 and a bleeder tube 102 are provided integrally with the casing main body 24 of the casing 23 so that as shown in FIG. 3 they extend obliquely upward on the side opposite to the protruding portion 24c, the bleeder tube 101 communicating with the parking control fluid pressure chamber 47, the bleeder tube 102 communicating with the annular chamber 66 connected to the parking release control fluid pressure chamber 60, and the bleeder tubes 101 and 102 having extremities thereof blocked by caps 103 and 104 so that they can be opened and closed.

When obtaining a parking brake state, the first pump 10A is driven by the electric motor 11, the cut valve 17A is energized and closed, the suction valve 18A is energized and opened and, furthermore, the first normally closed solenoid valve 106 of the fluid pressure control means 105A is energized and opened. Due to this, a brake fluid pressure is made to act on the brake fluid pressure chamber 80 and a parking control fluid pressure is made to act on the parking control fluid pressure chamber 47 and, furthermore, by energizing and opening the second normally closed solenoid valve 107 a fluid pressure is made to act on the parking release control fluid pressure chamber 60, thus making the brake piston 78 and the parking piston 44 move forward while suppressing forward movement of the lock piston 56. Subsequently, the first solenoid normally closed solenoid valve 106 is de-energized and closed, driving of the first pump 10A by the electric motor 11 is stopped, the cut valve 17A is de-energized and opened, and the suction valve 18A is de-energized and closed. By so doing, the fluid pressure of the parking release control fluid pressure chamber 60 is released, the lock piston 56 moves forward due to the spring force of the spring 64, and the lock mechanism 31 locks in response to forward movement of the parking piston 44 and the lock piston 56. However, when forward movement of the lock piston 56 is completed, the first normally closed solenoid valve 106 is temporarily energized and opened, thus releasing residual pressure of the parking control fluid pressure chamber 47.

In this way, when the parking piston 44 is locked by its forward movement, the push piston 45 is pushed forward via the dish springs 46, the relay piston 85 is moved forward by the push projection 45a provided at the front end of the push piston 45, the movement of the relay piston 85 makes the brake piston 78 move forward via the movable clutch body 92, the adjustment bolt 84, and the adjustment nut 83, and in the same manner as for normal braking, by pressing the linings 72a and 73a of the first and second friction pads 72 and 73 against opposite sides of the brake disk 71 so as to generate a braking force, a parking brake state can be obtained.

During the process of obtaining this parking brake state, since the relay piston 85 and the movable clutch body 92 are frictionally engaged by the pushing force of the parking piston 44 so that they cannot rotate relative to each other, relative rotation between the adjustment bolt 84 and the adjustment nut 83 is restricted. Therefore, when the front left wheel brake 2A functions as a parking brake, the above-mentioned automatic adjustment by the adjustment mechanism 82 is not carried out.

Furthermore, when obtaining a parking brake state during a normal braking operation, if a value detected by a pressure sensor 15A is sufficiently high, the fluid pressure control means 105A may be operated in a state in which the cut valve 17A is de-energized and opened, and the suction valve 18A is de-energized and closed, employing the master cylinder M as a fluid pressure source rather than driving the first pump 10A by the electric motor 11; furthermore, if a value detected by the pressure sensor 15A is low, the cut valve 17A may be energized and closed, the suction valve 18A may be energized and opened, and the fluid pressure control means 105A may be operated while driving of the first pump 10A by the electric motor 11 is carried out. Regardless of the value detected by the pressure sensor 15A, the cut valve 17A may be energized and closed, the suction valve 18A may be energized and opened, and the fluid pressure control means 105A may be operated while driving of the first pump 10A by the electric motor 11 is carried out.

When the parking brake state is released, the first pump 10A is driven by the electric motor 11, the cut valve 17A is energized and closed, the suction valve 18A is energized and opened, and the first and second normally closed solenoid valves 106 and 107 of the fluid pressure control means 105A are energized and opened. By so doing, the fluid pressure of the brake fluid pressure chamber 80, the fluid pressure of the parking control fluid pressure chamber 47, and the fluid pressure of the parking release control fluid pressure chamber 60 increase at the same time; during this process of pressure increase, a fluid pressure that is larger than the spring force of the spring 64 first acts on the lock piston 56, the lock piston 56 thereby retreats, and the resultant of the fluid pressure acting on the small piston 86 in the retreat direction and the force of the clutch spring 93 subsequently becomes larger than the forward pushing force acting on the parking piston 44 due to the fluid pressure of the parking control fluid pressure chamber 47, thus making the parking piston 44 retreat. The lock mechanism 31 thereby unlocks, and the parking brake state is released.

The volume of the spring chamber 61, which is formed within the sleeve 36 between the lock piston 56 and the end wall 24a of the casing main body 24, changes in response to axial movement of the lock piston 56; in order to prevent a change in the volume of the spring chamber 61 from being accompanied by an increase or decrease in the pressure thereof, a communicating passage 110 communicating with the spring chamber 61 is provided in the large diameter portion 56a of the lock piston 56 and the insertion shaft 59, the parking piston 44 is coaxially provided with a communicating passage 111 that makes the communicating passage 110 communicate with the air chamber 50, and the spring chamber 61 communicates with the air chamber 50, thus preventing the pressure of the spring chamber 61 from increasing or decreasing.

Furthermore, a screw hole 112, which is an opening part, is coaxially provided in the end wall 24a of the casing main body 24 of the casing 23 in a portion that the rear side of the lock piston 56 faces, and this screw hole 112 is detachably closed by screwing in a bolt 113, which is a covering member.

Figure 8:
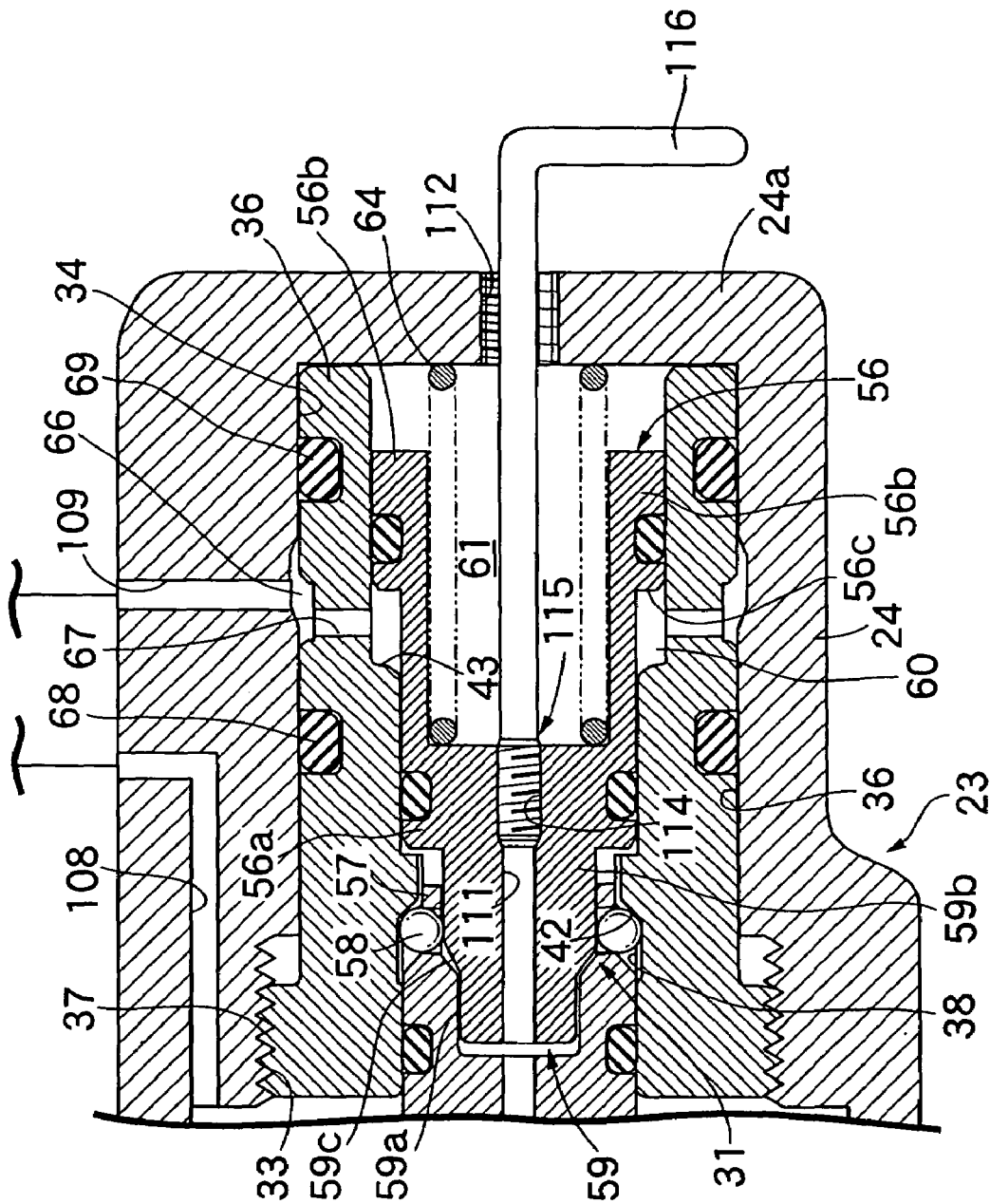
FIG. 8 is a sectional view showing a state in which a tool is coupled to a lock piston (first embodiment).

The lock piston 56 is provided with a tool connection part 115 formed by cutting an internal thread 114 on a rear part of the inner face of the communicating passage 110, and as shown in FIG. 8 a tool 116 can be inserted into the screw hole 112 and be detachably connected to the tool connection part 115, the screw hole 112 being opened by loosening and removing the bolt 113.

The front right wheel brake 2C has the same arrangement as that of the front left wheel brake 2A; when obtaining a parking brake state for the front right wheel brake 2C, the second pump 10B may be made to function as a fluid pressure source by operating the electric motor 11 in a state in which the suction valve 18B is energized and opened and the cut valve 17B is energized and closed, thereby controlling the operation of fluid pressure control means 105B.

The operation of this embodiment is now explained. When a parking control fluid pressure is made to act on the parking control fluid pressure chamber 47, which the rear side of the parking piston 44 of the parking operation mechanism 30 faces, by controlling a fluid pressure generated by the master cylinder M or the first and second pumps 10A and 10B by means of the fluid pressure control means 105A and 105B, the parking piston 44 moves forward, thus enabling parking brake states of the front left wheel and front right wheel brakes 2A and 2C to be obtained. Furthermore, since a parking operation state of the parking operation mechanism 30 is mechanically locked by the lock mechanism 31, a parking brake state can be obtained automatically; when the parking brake state is released, a parking release control fluid pressure may be made to act on the lock mechanism 31, and a parking brake state can be obtained automatically by a simple structure without consuming power in the parking brake state.

Moreover, the parking operation mechanism 30 is formed by providing the plurality of dish springs 46 between the parking piston 44, which is slidably fitted into the first slide hole 32 of the casing 23 and has its rear side facing the parking control fluid pressure chamber 47, and the push piston 45, which is connected to the relay piston 85 of the front left wheel and front right wheel brakes 2A and 2C, and the operation of the dish springs 46 enables the parking force acting on the front left wheel and front right wheel brakes 2A and 2C to change gradually accompanying the parking piston 44 moving forward or retreating.

Furthermore, since the free length of the dish springs 46 is set at a value so that a spring load cannot be exhibited when the parking piston 44 is at the retreat limit, in a parking brake release state it is possible to prevent the spring load of the dish springs 46 from acting on the front left wheel and front right wheel brakes 2A and 2C.

Moreover, since the push projection 45*a* at the front end of the push piston 45 of the parking operation mechanism 30 is inserted into the relay cylinder hole 87 provided in the first clamping arm portion 75*a* of the brake caliper 75 and abuts against the rear end of the relay piston 85 slidably fitted into the relay cylinder hole 87, and the parking piston 44 and the push piston 45 sandwiching the dish springs 46 are axially connected to each other while allowing a relative displacement in the radial direction, even if the axis of the relay cylinder hole 87 and the axis of the first slide hole 32 are displaced in a state in which the brake caliper 75 and the casing 23 are secured, the axial displacement can be absorbed, and the push projection 45*a* can be reliably inserted into the relay cylinder hole 87 and made to abut against the relay piston 85.

Furthermore, since the air chamber 50, which the front side of the parking piston 44 faces, is formed within the casing 23, and a change in the volume of the air chamber 50 accompanying axial movement of the parking piston 44 is absorbed by expansion and contraction of the O ring 54, it is possible to achieve smooth movement of the parking piston 44 while preventing the pressure of the air chamber 50 from increasing and decreasing, that is, it is possible to achieve a smooth parking brake operation and a smooth parking brake release operation.

Moreover, the O ring 54 is disposed between the brake caliper 75 and the casing 23, which are secured to each other, and carries out the function of cutting off the air chamber 50 from the exterior; it is unnecessary to employ piping, etc. exclusively used for breathing of the air chamber 50, and a change in the volume of the air chamber 50 can be absorbed while reducing the number of components.

Furthermore, the flange 27 provided integrally with the first clamping arm 75*a* of the brake caliper 75 and the flange 28 provided integrally with the front end of the casing main body 24 of the casing 23 are secured by the plurality of bolts 25 and nuts 26; one of these bolts 25 is disposed in a position offset from the imaginary circle C having its center on the axis of the cylinder hole 76 and being within the plane orthogonal to the axis of the cylinder hole 76 of the brake caliper 75, whereas the rest of the bolts 25 are disposed on the imaginary circle C, and the casing 23 is therefore secured to the first clamping arm 75*a* of the brake caliper 75 at a fixed relative position around the axis of the cylinder hole 76.

This enables the casing 23 to be secured to the brake caliper 75 without making a mistake in the positions of the protruding portion 24*b* provided on the casing main body 24 of the casing 23 or the bleeder tubes 101 and 102 relative to the brake caliper 75.

Furthermore, the insertion shaft 59, which forms part of the lock mechanism 31, is formed by coaxially and integrally connecting the small diameter shaft portion 59*a* on the front side and the large diameter shaft portion 59*b* via the tapered portion 59*c*, which changes the contact position of each of the spheres 58 from the small diameter shaft portion 59*a* to the large diameter shaft portion 59*b* in response to forward movement of the lock piston 56, the small diameter shaft portion 59*a* positioning the spheres 58 on the radially inner side when the parking piston 44 is at the retreat limit, and the large diameter shaft portion 59*b* positioning the spheres 58 on the radially outer side when the lock piston 56 moves to a forward position in response to the parking piston 44 moving forward from the retreat limit.

In accordance with such a structure for the insertion shaft 59, the spheres 58 are pushed up by being smoothly guided, by means of the tapered portion 59*c*, from the small diameter shaft portion 59*a* of the insertion shaft 59 toward the large diameter shaft portion 59*b* as a result of the lock piston 56 moving forward when the parking piston 44 moves forward, rearward movement of the spheres 58 is restricted by the restricting step 42 on the casing 23 side and radially inward movement thereof is restricted by the large diameter shaft portion 59*b*, and a locked state can thus be maintained. Furthermore, by making the parking release control fluid pressure act on the lock piston 56 so as to make the lock piston 56 retreat, the parking brake state can be released.

Moreover, the plurality of guide grooves 126 extending in the axial direction of the insertion shaft 59 are provided on the area of the inner face of the second slide hole 38 with which the spheres 58 make contact, the inner face of the restricting step 42, and the inner face of the guide hole 39 so that parts of the spheres 58 are rollably fitted into the guide grooves 126, each of the guide grooves 126 having a cross-sectional shape that is concavely curved with the radius R that is equal to or larger than the radius r of the spheres 58, and it is therefore possible to make the contact area of the spheres 58 and the sleeve 36 of the casing 23 relatively large, thereby relieving the stress acting on the spheres 58 the sleeve 36 of the casing 23 when in a locked state.

Furthermore, since the angle $\alpha$ formed by the tapered portion 59*c* relative to the axis of the insertion shaft 59 is set at 20 to 60 degrees, the spheres 58 can be smoothly pushed up when the lock piston 56, that is, the insertion shaft 59, moves forward while preventing the stroke of the insertion shaft 59 from becoming excessively large. That is, when the angle $\alpha$ is less than 20 degrees, although the spheres 58 can be smoothly pushed up, the stroke of the insertion shaft 59 becomes too large, and when the angle $\alpha$ exceeds 60 degrees, the force component for pushing up each of the spheres 58 in response to forward movement of the lock piston 56 becomes insufficient, and it becomes difficult to smoothly push up each of the spheres 58.

Furthermore, since the screw hole 112, which is closed by the bolt 113, is provided in the end wall 24*a* of the casing main body 24 of the casing 23 in the portion which the rear side of the lock piston 56 of the lock mechanism 31 faces, and the tool connection part 115, to which the tool 116 inserted through the screw hole 112 can be detachably connected, is provided in the rear part of the lock piston 56, by pulling the tool 116 connected to the tool connection part 115 against the spring force of the spring 64, it is possible to force the lock piston 56 to retreat, thus forcibly releasing the parking brake state by a manual operation, and this is convenient when carrying out maintenance or inspection.

Although an embodiment of the present invention is explained above, the present invention is not limited to the above-mentioned embodiment and may be modified in a variety of ways as long as the modifications do not depart from the present invention described in Claims.

The invention claimed is:

1. A parking brake system comprising: a parking piston (44) slidably fitted into a casing (23) so that a parking brake state can be obtained by forward movement in response to a parking control fluid pressure acting on a rear face side of the parking piston (44); a lock mechanism (31) provided within the casing (23) to the rear of the parking piston (44) so as to automatically lock in response to forward movement of the parking piston (44) in order to mechanically lock the parking piston (44) at a forward position and unlock in response to a parking release control fluid pressure acting on the lock mechanism (31); a fluid pressure source (10A, 10B, M); and fluid pressure control means (105A, 105B) for controlling a fluid pressure generated by the fluid pressure source (10A, 10B, M) so that the parking control fluid pressure and the parking release control fluid pressure can be obtained; the lock mechanism (31) comprising a lock piston (56) that is slidably fitted into the casing (23) to the rear of the parking piston (44) so that at least when the parking piston (44) moves forward a forward urging force acts on the lock piston (56) and that is arranged such that a parking release control pressure can act on the lock piston (56) toward the rear, a cylindrical retaining tube (57) that is integrally and coaxially connected to a rear part of the parking piston (44), spheres (58) that are retained at a plurality of positions in the peripheral direction of the retaining tube (57) so as to be able to move in a direction along the radial direction of the retaining tube (57), and an insertion shaft (59) that is connected integrally to the front end of the lock piston (56) so as to be axially relatively movably inserted into the retaining tube (57) in order to sandwich the spheres (58) between the insertion shaft (59) and the inner face of the casing (23) while contacting the spheres (58) from the inside of the retaining tube (57) and that can push the spheres (58) radially outward when the lock piston (56) moves to a forward position in response to forward movement of the parking piston (44) from a retreat limit, the casing (23) having provided therein, so as to surround the retaining tube (57), a large diameter hole (38) on the front side with which the radially outwardly pushed spheres (58) make contact, a small diameter hole (39) on the rear side with which the spheres (58) at a radially inner position make contact, and a restricting step (42) that is disposed between the large diameter hole (38) and the small diameter hole (39) in order to restrict retreat of the spheres (58) by abutting, from the rear, against the spheres (58) in contact with the large diameter hole (38), and a plurality of guide grooves (126) extending in the axial direction of the insertion shaft (59) being provided on the inner face of the large diameter hole (38), the inner face of the restricting step (42), and the inner face of the small diameter hole (39), the guide grooves (126) having a concavely curved cross-sectional shape with a diameter that is equal to or larger than the diameter of the spheres (58) so that part of each sphere (58) is rollably fitted into the guide groove (126).

* * * * *